UNITED STATES PATENT OFFICE.

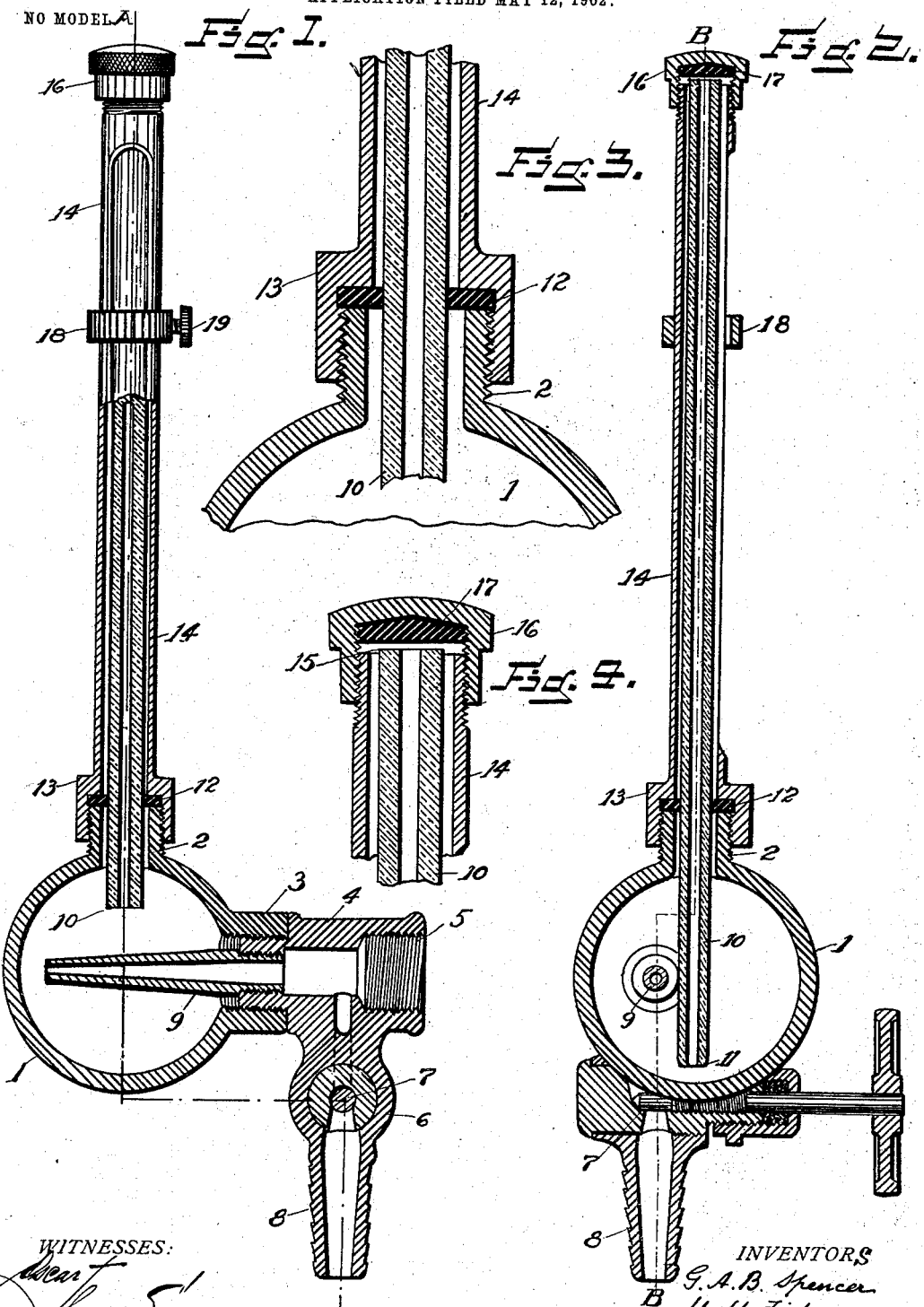

GARDENER A. B. SPENCER, OF SAN FRANCISCO, AND HERBERT H. FISHER, OF EAST OAKLAND, CALIFORNIA.

MERCURY TEST-GAGE.

SPECIFICATION forming part of Letters Patent No. 718,167, dated January 13, 1903.

Application filed May 12, 1902. Serial No. 107,015. (No model.)

*To all whom it may concern:*

Be it known that we, GARDENER A. B. SPENCER, residing at San Francisco, in the county of San Francisco, and HERBERT H. FISHER, residing at East Oakland, in the county of Alameda, State of California, citizens of the United States, have invented certain new and useful Improvements in Mercury Test-Gages, of which the following is a specification.

Our invention relates to improvements in mercury test-gages used for testing gas-pipes, the object of our invention being to provide a device of this character which shall be simple, strong, and durable in construction, compact in form, which will not, by tilting or shaking, permit the mercury to escape, which in particular will avoid the danger of breaking the glass tube containing the mercury, and which may be used either as a low-pressure gage or as a high-pressure gage by a simple and rapid adjustment.

Our invention therefore resides in the novel construction, combination, and arrangement of parts for the above ends, hereinafter fully specified, and particularly pointed out in the claims.

In the accompanying drawings, Figure 1 is a vertical section of our improved gage on the line B B of Fig. 2. Fig. 2 is a vertical section on a plane at right angles to that of Fig. 1 and on the line A A of Fig. 1. Fig. 3 is an enlarged vertical section showing the juncture of the mercury-chamber with the protector-tube, and Fig. 4 is an enlarged vertical section of the upper end of said tube.

Referring to the drawings, 1 represents the mercury-chamber, which is in the form of a globular casting having an upwardly-extending externally - threaded neck 2 vertically above the center of the globular chamber and an internally-threaded neck 3 extending laterally in a direction to one side of the center of the globular chamber. Into said latter neck 3 is screwed the end of a T-pipe 4, the opposite end of which is internally threaded, as shown at 5, to be screwed onto the end of any pipe connected with the system of gas-piping which is to be tested. The central member 6 of the T-pipe is provided with a needle-valve 7 and terminates in a corrugated tapering nozzle 8, arranged to be connected, by means of a rubber tube, with an air-pump.

Within that end of the T-pipe which screws into the globular casting is screwed a tapering nozzle 9, said nozzle passing to one side of the center, as shown, and extending to within a short distance of the opposite side of the globular chamber to that in which it is supported.

Through the vertical neck extends a glass tube 10, the lower end 11 of which extends to within a short distance of the bottom of the globular chamber. Around said glass tube is placed a rubber washer 12, and said washer is tightly compressed by screwing down thereupon the internally - threaded bell - shaped mouth 13 of a protector-pipe 14. By screwing down said mouth upon the neck 3 the rubber washer is tightly compressed and forced inward around the glass tube 10, thus holding the same very firmly in place and holding the bottom end thereof up from contact with the inner surface of the globular chamber. The glass tube preferably extends a short distance above the end of the protector-pipe, as shown at 15. Around the upper end of said protector is screwed a cap 16, within which is received a rubber washer 17. By screwing down said cap said washer can be brought down upon the end of said glass tube, so as to hermetically close the same.

An indicator-ring 18 may be moved to any point on the protector-tube to indicate the height at which the mercury stands at the beginning of the operation of testing the gas-pipe system and can be there secured by means of a set-screw 19.

We regard the novel and important features of this invention to be as follows: First, the construction and shape of the mercury-chamber provides important advantages in that it furnishes a receptacle for mercury of a convenient and compact form. In particular the arrangement and position of the two necks of said chamber permit the vertical mercury-tube and the horizontal gas-tube to cross each other without deviating from straight lines and so that they terminate within a very short distance of the walls of the chamber opposite to that at which they respectively enter. This insures that however the device be turned around the mercury will not be able to run out through either tube, since the end of each tube which opens into the chamber is at the highest point thereof when the other end of the same tube is directed downward.

A second important feature of the invention consists in the arrangement which is made for holding the glass in place without breaking. Heretofore with mercury test-gages commonly used a considerable percentage have broken by reason of the glass tube being tightly and inflexibly compressed within the neck of the mercury-chamber through which it passes. It will be observed that in the present construction the glass tube passes through the neck at a considerable distance from the inner wall thereof, and is freely spaced therefrom. It is only tightly compressed by the rubber washer, which, being resilient and yielding, does not tend to break the glass by its pressure. Thus considerable lateral strain may be put upon the glass tube without breaking it at the neck.

A further important feature of the invention resides in the construction of the top of the protector-tube. To explain the advantages of this construction, it may be first stated that it is a common practice with plumbers who wish to economize on a job of stopping up leaks in the gas-piping of a house to stop up the sand-holes by a cement which will withstand a low pressure of gas, but will not withstand a high pressure. A gas-inspector wishing to thoroughly test whether a gas-pipe system is or is not sound and free from leakage will first apply a high pressure to the gas-piping system. This will have the effect of blowing out the cement so applied. It takes a considerable time, however, to test a leakage through a small hole under a high pressure, as the mercury falls very slowly during the escape of the gas through the leak. It is therefore desirable to apply immediately afterward a low pressure, which will detect the leakage much more rapidly. The object of our invention, therefore, has been to provide a device by which first the high pressure may be applied to a system of piping to test the same and then by a very simple and rapid adjustment a low pressure may be applied very quickly. This is done by providing the rubber gasket 17 inside the cap 16, so that when said cap is screwed down said gasket closes the end of the glass tube and confines the air therein. The device may now be used as a high-pressure test-gage, the mercury rising against the pressure of the air confined and compressed within the glass tube. After the air which was pumped into the cistern to high pressure has been allowed to escape, so as to reduce the pressure in the cistern to a low pressure, the gage is converted into a low-pressure test-gage by unscrewing the cap, permitting the air to escape, when the pressure will equal simply the weight of the column of mercury which it supports.

We claim—

A mercury test-gage comprising a mercury-chamber, a straight vertical glass tube for mercury, and a straight horizontal nozzle for discharging air thereinto, said nozzle and glass tube crossing each other, and each terminating within a short distance of the wall of the chamber opposite to that through which it enters, substantially as described.

In witness whereof we have hereunto set our hands in the presence of two subscribing witnesses.

G. A. B. SPENCER.
H. H. FISHER.

Witnesses:
FRANCIS M. WRIGHT,
BESSIE GORFINKEL.